May 27, 1941.                R. J. HONEKAMP                2,243,277
                            CHIP CONTROL MEANS
                           Filed Jan. 5, 1940                2 Sheets-Sheet 1
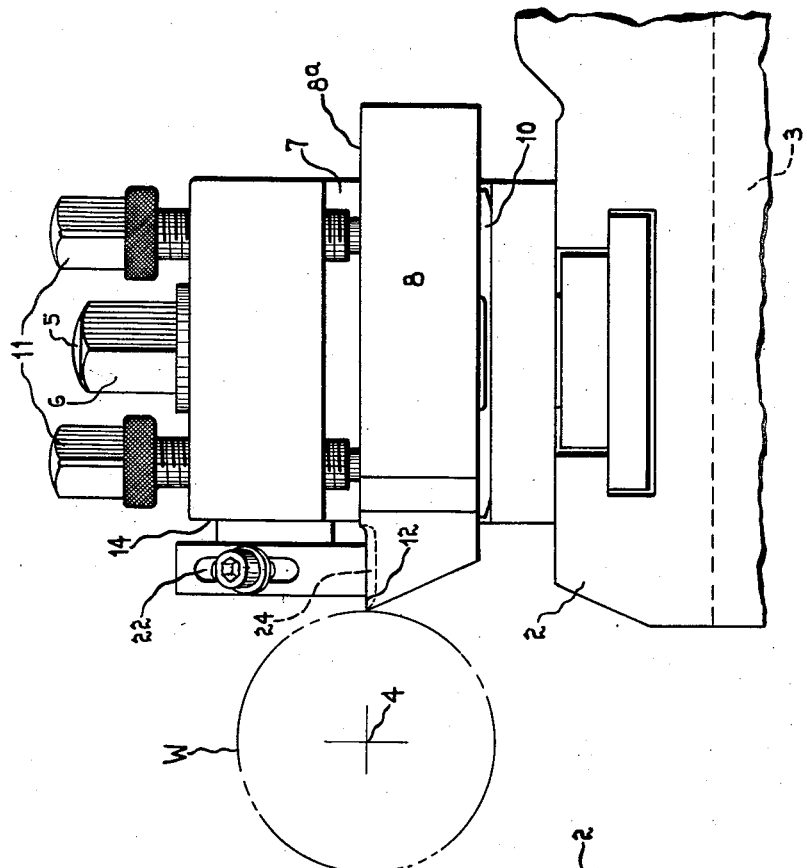
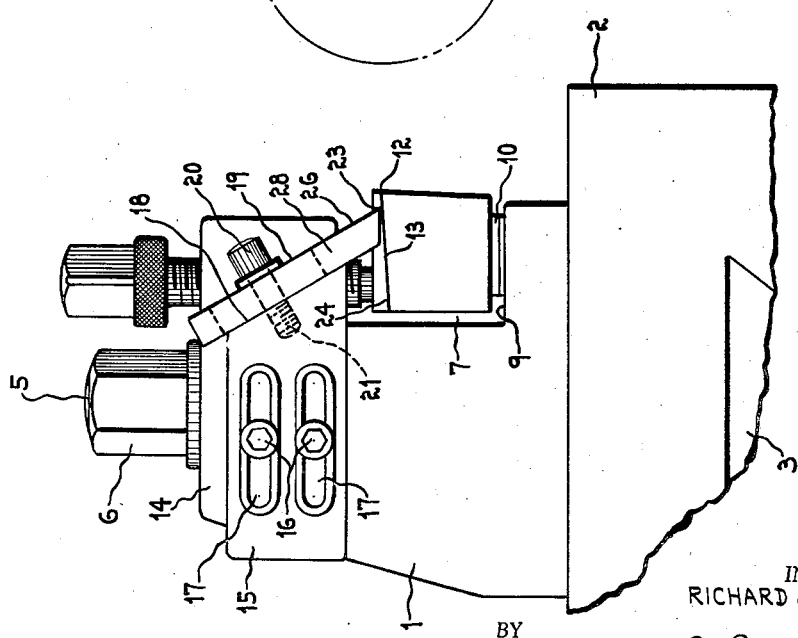
INVENTORS.
RICHARD J. HONEKAMP
BY
ATTORNEY.

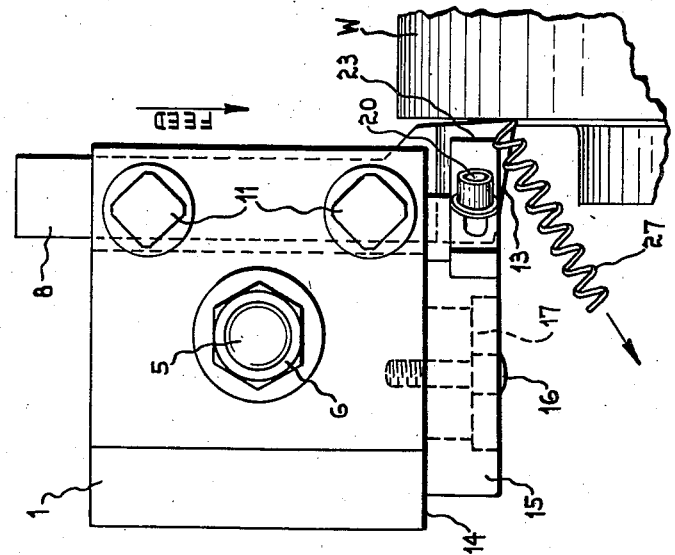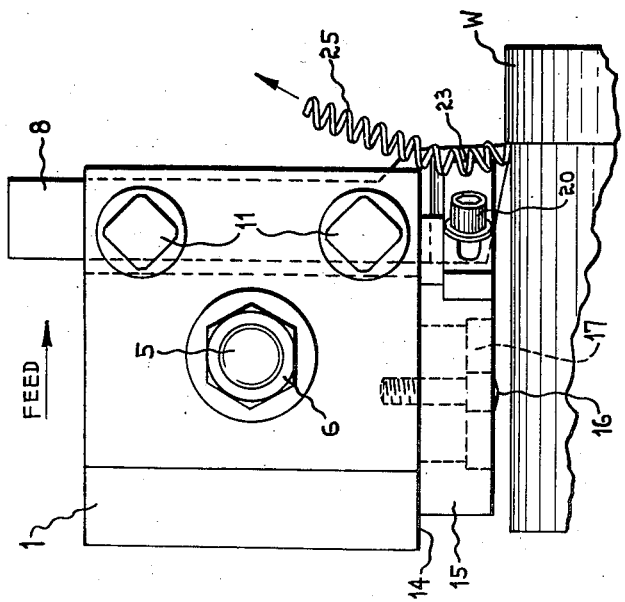

Patented May 27, 1941

2,243,277

UNITED STATES PATENT OFFICE 2,243,277

CHIP CONTROL MEANS

Richard J. Honekamp, Cincinnati, Ohio, assignor to The R. K. LeBlond Machine Tool Company, Cincinnati, Ohio, a corporation of Delaware Application January 5, 1940, Serial No. 312,524

5 Claims. (Cl. 82—36)

This invention pertains to chip control means for cutting tools of machine tools. More particularly this invention pertains to a chip breaker applicable to a cutting tool of a lathe.

An object of this invention is to provide a chip control means or chip breaker for a cutting tool for a lathe which is equally effective when making turning cuts as when making facing cuts in the lathe.

Another object of this invention is to provide a chip breaker which is universally mounted on the tool holder for the lathe tool and which may be easily and simply adjusted relative to the cutting edge of the tool so as to be effectively positioned for either turning or forming cuts without a readjustment each time these different kinds of cuts are undertaken.

A still further object is to provide a chip breaker for a lathe tool which is adjustably mounted on the tool holder for the lathe tool fully independent of the lathe tool but contacting said lathe tool in a sharp knife edge abutment relationship.

A still further object of this invention is to provide a chip breaker having a knife edge which may be adjusted against the top face of the cutting tool, closely associated with the cutting edge thereof, so as to function equally effective when making turning cuts as when making facing cuts in the lathe to which it is applied.

Further features and advantages of this invention will appear from the detailed description of the drawings in which:

Fig. I is a front elevation of the chip control means or chip breaker shown mounted on a typical lathe tool holder containing a cutting tool.

Fig. II is a right hand end elevation of the arrangement shown in Fig. I showing the relationship of the cutting tools, chip breaker, and a typical work piece to be machined in the lathe.

Fig. III is a plan view of the tool holder as shown in Figs. I and II illustrating the operation of the chip breaker when making turning cuts, that is, cuts parallel with the axis of the work piece to be turned.

Fig. IV is a similar plan view to that of Fig. III but showing the operation of the chip control means when making facing cuts, that is, cuts perpendicular to the axis of rotation of the work piece in the lathe.

For illustrative purposes this invention is shown applied to a typical lathe tool holder 1, appropriately mounted on the tool slide 2, of a lathe which slide in turn may be carried in the usual manner on the lathe carriage so that the tool holder 1 may be moved perpendicular to the axis of rotation of the work in the lathe by operation of the cross slide 2 on the carriage 3 or may be fed parallel with this axis 4 by longitudinal movement of the carriage 3 along the lathe bed.

Tool holder 1 is appropriately bolted to the cross slide 2 by a suitable stud 5 and nut 6 and has in it a slotted portion 7 to receive a suitable cutting tool 8. The cutting tool 8 is bound to the lower surface 9 of the slot 7 through the usual tool post wedge 10 by means of the tool post screws 11 which come down on the top surface 8a of the cutting tool 8. The cutting tool 8 has the cutting edge 12 and the front angular edge 13 suitably relieved for proper cutting action on a work piece W.

On the front face 14 of the tool holder 1 is adjustably mounted the supporting block 15 by suitable screws 16 tapped into the surface 14 and passing through elongated slotted holes 17 of the block 15. On the right hand end of this supporting block 15 (Fig. I) is provided an angular surface 18 on which is mounted the chip control means or chip breaker 19 by means of a suitable screw 20 which is tapped into the supporting block 15 by suitable threads 21 passing through the elongated hole 22 in the chip breaker 19. By this arrangement of the mounting and clamping screw 20, the chip breaker 19 may be positioned with relation to the various different type tools 8 which might be inserted in the tool holder 1.

This particular chip breaker is uniquely constructed in that it is formed of a piece of high speed steel or other hard material and has a sharp knife edge 23 formed on its lower end which may be positioned in firm engagement with the top surface 24 of the cutting tool 8 in close adjacency to the cutting edge 12 of the tool. By this unique arrangement the particular shape of the tool has no effect on the proper adjustment of this type of chip breaker in proper relationship to the cutting edge of the tool.

Another feature of this invention involves the placement of this chip breaker in such a way that it functions equally well in making turning cuts, as shown in Fig. III as when making forming cuts as shown in Fig. IV. In Fig. III, when turning cuts are undertaken, the chip 25 is removed from the work by the cutting edge 12 of the tool and proceeds away from the work rotating against the inclined surface 26 of the chip breaker 19 causing the chip to form a regular spiral away from the work and the tool holder 1 as shown in Fig. III so that it will not become entangled therewith causing damage to the work surface and interruption of the cutting operation which would otherwise be necessary in order to clear out the chips particularly when making cuts at high rates of speed as in finishing of parts at higher speeds by means of carbide cutting tools.

Likewise during the facing operation the tool is fed perpendicular to the axis of rotation 4 of work W, as shown in Fig. IV. The chip is then removed from the work by the cutting edge 13 of tool as shown in Fig. IV, the chip 27 in this instance proceeding outwardly away from the work surface being machined while engaging the side 28 of the chip breaker 19 so as to cause the chip to form a regular spiral passing outwardly as shown in this Fig. IV again preventing entanglement of irregular chips with the work and tool during the cutting operation.

Having thus fully set forth and described my invention what I claim as new and desire to secure by United States Letters Patent is:

1. In a chip control device for lathe, a tool holder, a tool in said tool holder, a chip breaker on said tool holder comprising a support adjustably mounted on said tool holder for movement parallel with the axis of rotation of the work in a plane substantially tangent to the surface of said work being machined by said tool, and a chip deflecting member adjustably mounted on said support for movement in a plane angularly related to said axis for engagement with said tool.

2. In a chip control device for lathe, a tool holder, a tool in said tool holder, a chip breaker on said tool holder comprising a support adjustably mounted on said tool holder for movement parallel with the axis of rotation of the work in a plane substantially tangent to the surface of the work being machined by said tool, a chip deflecting member adjustably mounted on said support for movement in a plane perpendicular to said first mentioned plane and angularly related to said axis for engagement with said tool.

3. In a chip control device for lathe, a tool holder, a tool in said tool holder, a chip breaker on said tool holder comprising a support adjustably mounted on said tool holder for movement parallel with the axis of rotation of the work in a plane substantially tangent to the surface of the work being machined by said tool, a chip deflecting member having a knife edge adjustably mounted on said support for movement in a plane substantially perpendicular to said first mentioned plane and angularly related to said axis for engagement of said knife edge with said tool.

4. In a chip control device for lathe, a tool holder, a tool in said tool holder, a chip breaker on said tool holder comprising a support adjustably mounted on said tool holder for movement parallel with the axis of rotation of the work in a plane substantially tangent to the surface of the work being machined by said tool, and a chip deflecting member adjustable in a plane substantially perpendicular to said first mentioned claim having a pair of chip engaging surfaces adjustably mounted on said support, one of said surfaces serving to deflect and control chips when making turning cuts, the other of said surfaces serving to deflect and control chips when making forming cuts on a work piece in said lathe.

5. In a chip control device, a cutting tool, an element mounted relative to said tool, said element having a pair of angularly related surfaces extending from the cutting edge of the tool for spirally curling the chip and controlling the cross sectional size thereof, said element including a knife edge movable against said cutting tool in close adjacency to its cutting tip in a direction angularly related to the axis of rotation of the work being turned.

RICHARD J. HONEKAMP.